Oct. 20, 1959 S. I. KRAMER 2,909,726
SYSTEM FOR TESTING ELECTRIC SIGNAL TRANSFER
DEVICES WITH PARABOLIC TESTING SIGNAL
Filed July 14, 1958 3 Sheets-Sheet 1
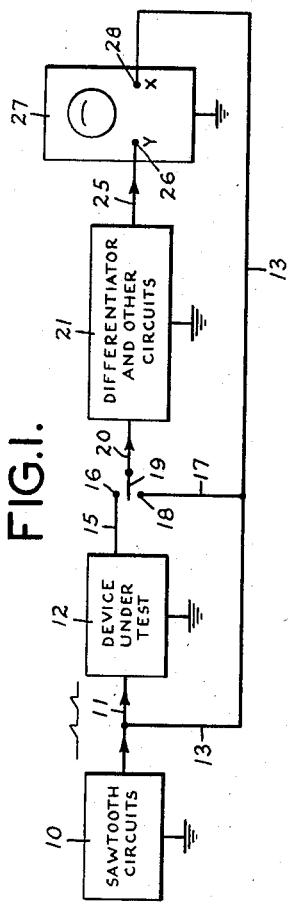
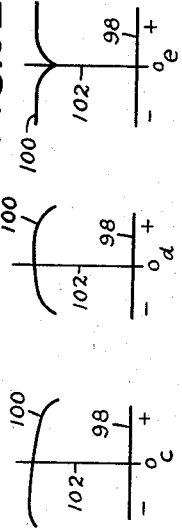
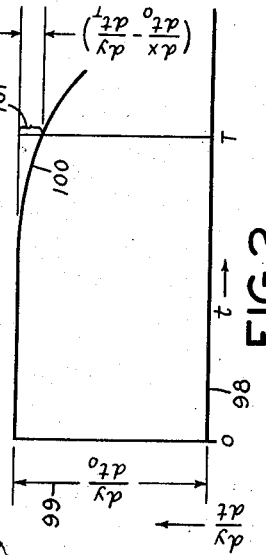
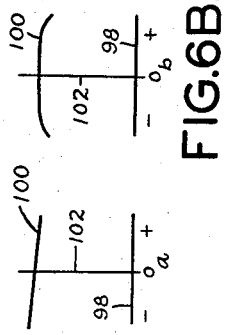
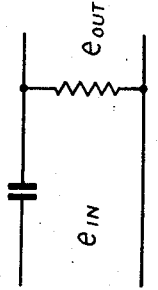
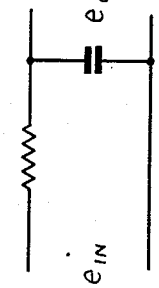
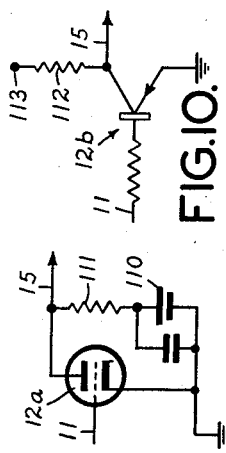
INVENTOR
STANLEY I. KRAMER
BY
HIS ATTORNEYS

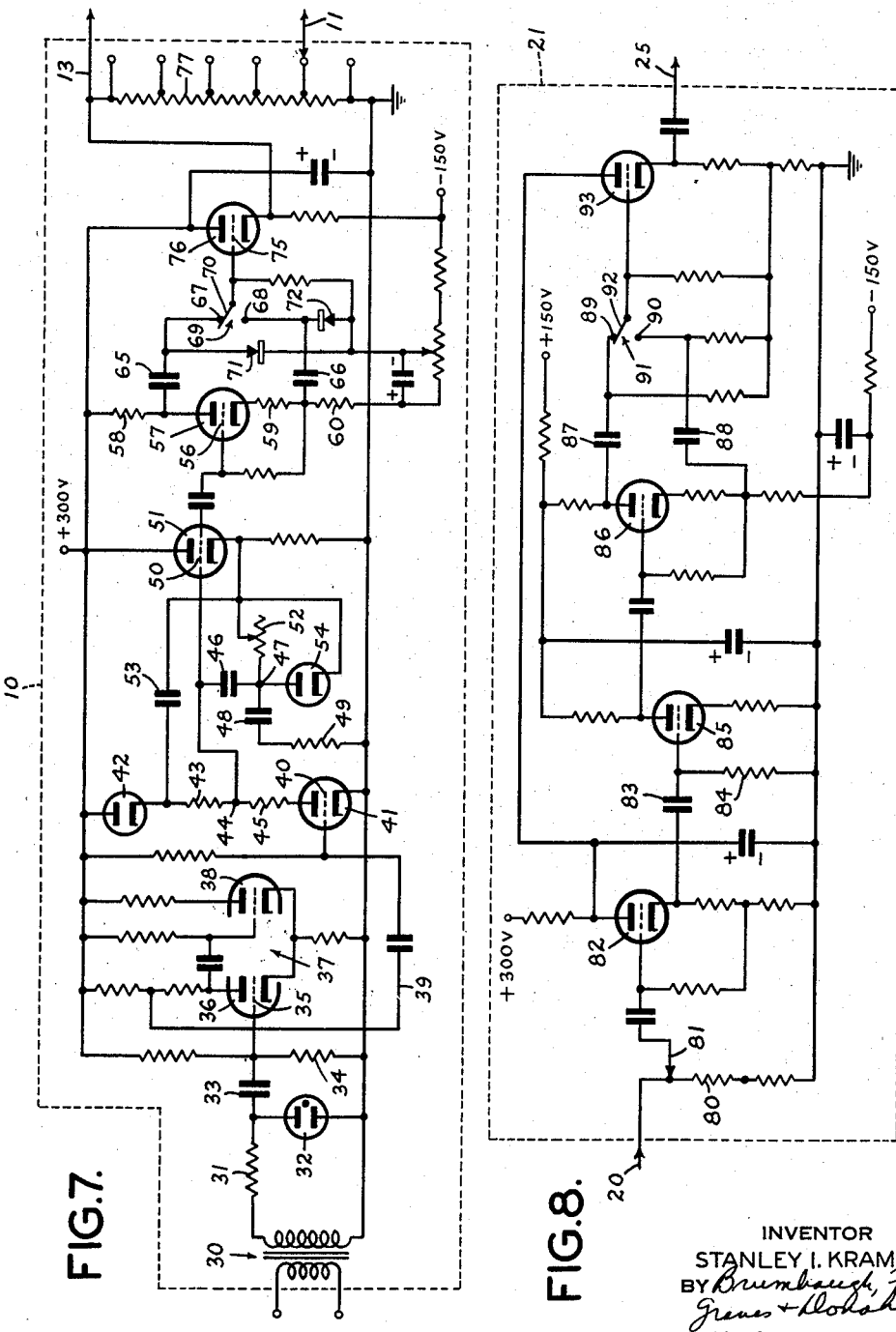

Oct. 20, 1959

S. I. KRAMER 2,909,726

SYSTEM FOR TESTING ELECTRIC SIGNAL TRANSFER
DEVICES WITH PARABOLIC TESTING SIGNAL

Filed July 14, 1958

INVENTOR
STANLEY I. KRAMER
BY Brumbaugh
Free, Graves + Donohue
HIS ATTORNEYS

United States Patent Office 2,909,726
Patented Oct. 20, 1959

2,909,726

SYSTEM FOR TESTING ELECTRIC SIGNAL TRANSFER DEVICES WITH PARABOLIC TESTING SIGNAL

Stanley I. Kramer, Brightwaters, N.Y., assignor to Fairchild Engine and Airplane Corporation, Hagerstown, Md., a corporation of Maryland Application July 14, 1958, Serial No. 748,339

3 Claims. (Cl. 324—57)

This invention relates generally to systems for testing electric signal transfer devices as, say, passive networks, vacuum tubes, transistors, or circuit stages such as amplifier stages. More particularly, this invention relates to testing systems of the sort described wherein an electric testing signal is applied to the input of such device to be transferred through the same, the testing signal after such transfer is electrically differentiated, and the differentiated signal is functionally related as a dependent variable to some other independent variable.

This application is a continuation-in-part of my copending application Serial No. 613,753, filed October 3, 1956.

It is known in the prior art that useful information can be obtained about an electric characteristic of a signal transfer device by differentiating a testing signal which has been passed through the device. For example, United States Patent 2,646,545 to King teaches the application of a signal of staircase waveform to an amplifier, the differentiation of this signal after passage through the amplifier to produce by such differentiation a succession of signal "spikes" of varying amplitude, and the presentation of such spikes as vertical deflections in a cathode ray tube trace which is horizontally deflected as a function of time. It is stated in the patent that such presentation will permit a check on the linearity of the amplifier.

The technique taught in the King patent is, however, characterized by a number of disadvantages among which are the following. First, while the height of any "spike" appearing on the screen of the cathode ray tube depends in part upon the nonlinear response of the amplifier, this height also depends in part on the linear response of the amplifier, and, thus, it is impossible by inspection to readily dissociate the nonlinear response from the linear response. Accordingly, in the King technique it is necessary to resolve the height of the spikes into a linear component and a nonlinear component in order to determine the degree of nonlinearity.

Second, the discussed prior art technique does not permit a determination, with the sensitivity, which is desirable, of the nonlinearity or other electrical characteristics of the device being tested. Third, the presentation of the results of the test as a series of spikes rather than a continuous curve, complicates the interpretation of the presentation. Fourth, the "staircase" test signal which is used is characterized by high frequency components, and is thus not suitable for the testing of devices as, say, some transformers or transistors, which will distort these high frequency components to thereby introduce a spurious frequency factor into the measure obtained, for the tested device, of a characteristic thereof which (like, say, nonlinearity) is not dependent on frequency.

It is accordingly an object of the invention to provide for testing of an electric signal transfer device in a manner whereby quantitative values obtained by the testing need not be resolved into components in order to permit formulation of a measure of a characteristic being tested for.

Another object of the invention is to provide for testing of an electric signal transfer device in a manner whereby the measure obtained of a characteristic being tested for is a measure of improved sensitivity and accuracy.

A further object of the invention is to provide for testing of an electric signal transfer device in a manner whereby the results obtained are, for easier interpretation, presented in the form of a continuous functional relation.

A still further object of the invention is to provide for testing of an electric signal transfer device in a manner whereby frequency distortion is minimized.

These and other objects are realized according to the invention by providing a source of testing signals or sawtooth or parabolic waveform, differentiating means, and registering means which may be a cathode ray oscilloscope, and which is adapted to develop a trace or other observable indication representing a first input signal as a variable which is functionally related, as a dependent variable, to a second input signal supplied to the registering means. The mentioned sawtooth or parabolic signal source is connected to an input of a signal transfer device to be tested such that the source supplies one or more linear sawtooth or parabolic signals to the said input. After passing through the device to an output thereof, the signals, when of sawtooth waveform, are differentiated once by the differentiating means and are then applied, as the mentioned first input signal, to the registering means. If the signals are of parabolic waveform, the signals are differentiated twice by the differentiating means, and are then applied, as the mentioned first input signal, to the registering means. The second input signal for the registering means may be constituted of sawtooth signals or some other signal whose variations, when correlated with the variations in the differentiated signal, will permit a finding to be made concerning a characteristic of the device under test.

The testing system just described will, when operated, represent the differentiated signal as functionally related to the second input signal supplied to the registering means. Such representation of the differentiated signal permits the formulation of a measure of a characteristic, such as nonlinearity, of the tested device without the necessity of resolving quantitative values obtained in the results into separate components. As later described in more detail, the measure which is obtained is a measure of improved sensitivity of the characteristic being tested for. The actually observed functional relation is presented in continuous form to thereby facilitate the interpretation thereof.

For a better understanding of the invention, reference is made to the following method and apparatus embodiments thereof and to the drawings which accompany the description and wherein:

Fig. 1 is a block diagram of one form of apparatus suitable for carrying out methods according to the present invention.

Fig. 2 is a diagram of the output trace provided by the apparatus of Fig. 1;

Fig. 3 is a schematic diagram of a simple RC transfer network with the capacitor thereof shunted across the signal path;

Fig. 4 is a graph of the voltage response of the Fig. 3 network to a linear sawtooth signal as the duration $t$ of the signal varies relative to the time constant T of the Fig. 3 network;

Fig. 5 is a schematic diagram of a simple RC transfer network with the capacitor thereof being connected in series with the signal path;

Figure 11:
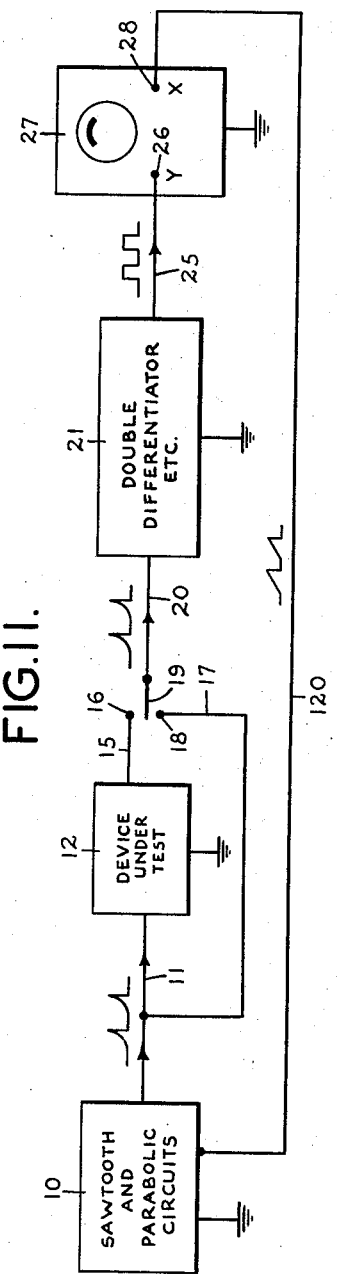
Figure 13:
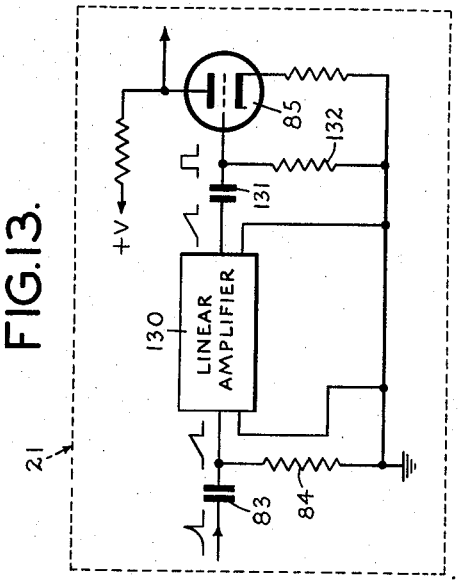
Figure 12:
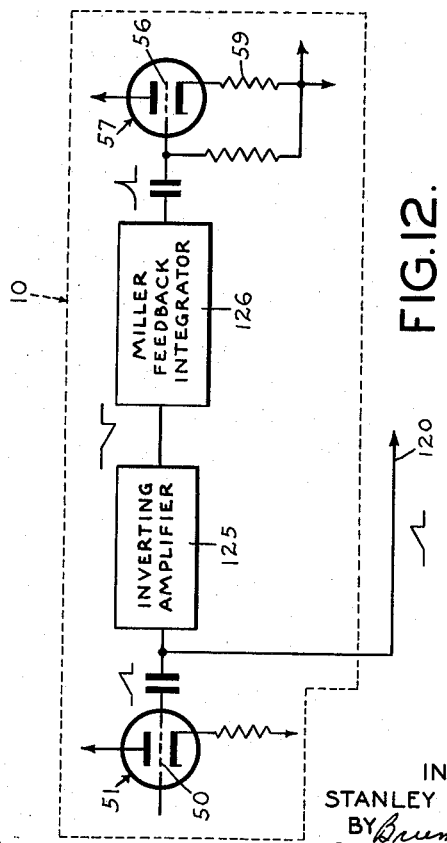

Figs. 6A–6E, inclusive, are diagrams of indications obtained by the apparatus of Fig. 1 under differing test conditions;

Figs. 7 and 8 are detailed schematic diagrams of certain circuits shown as blocks in Fig. 1;

Figs. 9 and 10 are diagrams of detailed applications of the system of Fig. 1;

Fig. 11 is a block diagram of a modification of the apparatus shown in Fig. 1;

Fig. 12 is a diagram, partly in schematic and partly in block, of the manner in which the circuits shown in Fig. 7 are modified when incorporated into the Fig. 11 apparatus; and Fig. 13 is a diagram, partly in schematic and partly in block, of the manner in which the circuits shown in Fig. 8 are modified when incorporated into the Fig. 11 apparatus.

Referring to Fig. 1, an electrical unit 10 entitled "sawtooth circuits" generates linear sawtooth signals which are supplied, first, by a lead 11 to a signal transfer device 12 to be tested, and second, to a lead 13 which bypasses the device 12. The signal transfer device 12 may, as stated, be a passive network, a vacuum tube, a transistor, an amplifier stage, or any other electric circuit component or system of components adapted to transfer an electric signal from an input of the component or component system to an output of the component or component system.

An output of device 12 is connected by a lead 15 to a fixed contact 16. The lead 13 is connected by a branch lead 17 to a fixed contact 18. A movable contact 19 may be manually thrown to selectively close with either the fixed contact 16 or the fixed contact 18. Movable contact 19 is connected by lead 20 to the input of a unit 21 designated "differentiator and other circuits." Unit 21 includes a means for differentiating the signal supplied thereto. This differentiating means may be of the electronic feed-back type, but for most applications a simple RC differentiator having a short time constant is completely satisfactory. The unit 21 may also include other circuits as later described.

The output signal from unit 21 is applied by a lead 25 to the "Y" or vertical deflecting input 26 of a cathode ray oscilloscope 27 provided with a D.C. vertical deflecting amplifier. The horizontal deflecting signal for the oscilloscope may be provided, as shown in Fig. 1, by connecting the lead 13 to the "X" horizontal deflecting input 28 of the oscilloscope. If desired, however, other horizontal deflecting signals may be used, as, say, the signal appearing at the output of the device 12.

Figs. 7 and 8 show details of the electric units 10 and 21 represented in block form in Fig. 1. In the unit 10 (Fig. 7) an alternating signal of well regulated frequency (as, say, a signal derived from a 60-cycle power line) is passed through a transformer 30 to a pulse shaping circuit which is comprised of a resistor 31 and a gas tube 32 in series, and which serves to give a generally square wave-form to the signal. The square waveform signal is differentiated by the series combination of capacitor 33 and resistor 34 to produce positive triggering pulses which are applied to the grid 35 of the normally cut-off, left-hand triode section 36 of a vacuum tube 37 whose left and right-hand triode sections 36, 38 are connected in circuit with associated resistors and capacitors to form a monostable multivibrator.

The negative square wave output of the multivibrator is supplied via lead 39 to the grid 40 of a triode 41 which normally draws plate current through the series path of diode 42, resistor 43, junction 44, and resistor 45. A capacitor 46, a junction 47, a capacitor 48, and a resistor 49 are connected in series between the junction 44 and the cathode of tube 41. The negative square wave applied to grid 40 cuts off triode 41 to produce charging of capacitors 46, 48 to thereby cause a sawtooth voltage to appear between junction 44 and ground.

The sawtooth voltage, in order to improve the linearity thereof, is supplied to the grid 50 of a cathode follower tube 51 whose output is supplied to junction 47 through a variable resistor 52, and whose output is also supplied to the junction of tube 42 and resistor 43 through the capacitor 53. The couplings just described cause the output of cathode follower 51 to act as a regenerative feed-back signal which renders substantially linear the sawtooth voltage developed at junction 44. The diode 42 is an isolating diode used to prevent this regenerative feed-back signal from being fed back to the power supply. Another diode 54 is, for D.C. recovery purposes, connected between junction 47 and the output of cathode follower tube 51.

From the grid 50 of tube 51 the sawtooth signals are applied to the grid 56 of tube 57 connected with the resistors 58, 59, 60 to act as a phase splitter. The separate outputs of the phase-splitter tube 57 are coupled through the capacitors 65, 66 to the fixed contacts 67, 68 of a switch 69 having a movable contact 70. The D.C. restorer diodes 71, 72 are connected, respectively, to the junctions of capacitors 65, 66 with contacts 67, 68 in order to facilitate rapid discharge of the capacitors 65, 66 following each charging thereof by a sawtooth signal.

The movable contact 70 of switch 69 is manually operable to selectively close with either the fixed contact 67 or the fixed contact 68. By selectively closing contact 70 with, respectively, the fixed contact 68 and the fixed contact 67, it is possible to produce at the output of unit 10 a sawtooth signal which rises in voltage during its duration and a sawtooth signal which falls in voltage during the duration thereof.

The movable contact 70 is connected to the grid 75 of a cathode follower tube 76 whose output is connected to the lead 13 which is shown (Fig. 1) as supplying the horizontal deflecting signal for the oscilloscope 27. An output attenuator 77 (Fig. 7) is connected between the lead 13 and ground. The lead 11 is selectively connectable to various taps on the attenuator 77 to thereby provide selectivity in the amplitude of sawtooth signal supplied by lead 11 to the device 12 (Fig. 1).

In the unit 21, the input signals received thereby on lead 20 (Figs. 1 and 8) may be selectively attenuated by a potentiometer (Fig. 8) consisting of a resistor 80 and a tap 81 which rides on the resistor. From the tap 81, the signals are passed through a cathode follower 82 to a differentiating circuit constituted of the capacitor 83 and the resistor 84. The differentiated signal which results from the circuit is amplified in a tube 85 to be thereafter supplied to the input of a phase-splitter tube 86. The separate phase-split outputs of this tube are supplied through the capacitors 87, 88 to, respectively, the fixed contacts 89, 90 of a switch 91 having a movable contact 92. By manually operating movable contact 92 to selectively close with either fixed contact 89 or with fixed contact 90, it is possible to reverse the polarity of the differentiated signal so that, whether the sawtooth signal applied to device 12 is positive-going or negative-going, the trace developed on the screen of the oscilloscope 27 (Fig. 1) in the presence of the differentiated signal is, say, upwardly displaced from the path followed by the trace when zero signal is applied to the vertical deflecting input 26. The signal appearing on movable contact 92 is passed through a final cathode follower tube 93 to be applied to the lead 25 which furnishes (Fig. 1) the vertical deflecting signal for the oscilloscope 27.

Considering now the operational characteristics of a system according to the present invention, the sawtooth signal source should be capable of providing sawtooth output signals whose amplitude will cover the dynamic range of interest of the device 12 being tested. Moreover, the linearity of the sawtooth signals should be as high as possible, and, in any event, should be substantially greater than the expected degree of linearity of the device being tested. When the device 12 draws considerable power, it is desirable to so operate the sawtooth unit 10 that the unit has a low-duty cycle. The advantage of such low-duty cycle is that it permits measurements to be made using peak amplitudes which would cause excessive dissipation under steady state conditions.

As a preliminary to actual testing of the device 12, it is often desirable to determine if the device 12 loads the sawtooth unit 10 to an undue degree. In furtherance of this determination, the movable contact 19 (Fig. 1) is thrown to close with the fixed contact 18 to supply the sawtooth signals from unit 10 as the input signal to the differentiator unit 21. Next, the device 12 is disconnected from sawtooth unit 10, and, under these conditions a trace is developed on the oscilloscope. The trace so obtained represents the differentiated form of the sawtooth signal from the sawtooth unit 10 when no loading is impressed thereon. The device 12 is then reconnected to sawtooth unit 10 with movable contact 19 being kept closed with fixed contact 18. Under these last-named conditions, the trace which is obtained represents the differentiated output of sawtooth unit 10 when loaded by device 12. The absence of any substantial difference in shape between the latterly-obtained trace and the formerly-obtained trace indicates that the device 12 does not load the sawtooth unit 10 unduly so as to introduce an error in the results obtained by the measurement procedure about to be described.

As a second preliminary, the movable contact 19 is thrown to a position midway between fixed contacts 16, 18 (so that zero signal is supplied to the "Y" input 26 of oscilloscope 27), and the path of the horizontal trace, which then appears on the screen of the oscilloscope, is marked or otherwise noted. This path, which is represented in Fig. 2 by the line 98, represents the base line to which the trace is referred during the testing of the device 12.

To test device 12 with positive-going signals, the movable contact 70 of switch 69 (Fig. 7) is closed with fixed contact 68 to apply sawtooth signals of rising amplitude to the device 12. Also, the movable contact 92 of switch 91 (Fig. 8) is thrown to close with the appropriate one of the fixed contacts 89, 90 which will cause the trace developed in the presence of the differentiated signal to be upwardly displaced from the base line 98.

Next, the movable contact 19 is thrown to close with fixed contact 16 to thereby couple the output of device 12 to the input of differentiator unit 21. In this circumstance, a trace 100 (Fig. 2) appearing on oscilloscope 27 will represent the derivative of the output signal from device 12 with respect to time in terms of the vertical displacement 99 of the trace from the base line 98. If the device 12 has a linear response to the sawtooth signals from unit 10, the value of this derivative will be constant, and the trace on oscilloscope 27 will accordingly appear as a straight horizontal line. If, on the other hand, the device 12 responds nonlinearly to the sawtooth signals, the mentioned derivative will vary in value, and the trace on the oscilloscope will accordingly be characterized by a vertical deviation from its initial horizontal path, the deviation becoming progressively more pronounced as the trace sweeps from left to right. A deviation of this sort in the trace 100 is represented by the distance 101 in Fig. 2. This distance 101 is significant in that the ratio, amount of vertical deviation 101 of the trace 100 at a given time T to initial amount of displacement 99 of trace 100 from the base line 98, is an excellent measure of the degree of nonlinearity of the device 12. It will be noted that the nonlinear response (deviation 101) and the linear response (vertical displacement 99) which are used to determine degree of non-linearity are horizontally displaced on the oscilloscope screen to thereby permit convenient separate observations of the two responses. By virtue of this horizontal displacement, a measure of the degree of nonlinearity of device 12 may be obtained without first having to resolve a vertical displacement value of the trace at a given horizontal point into two components (corresponding to 99 and 101) in order to obtain the measure of nonlinearity.

The procedure just described tests the device 12 with positive-going sawtooth signals. It may also be desirable to test device 12 with negative-going sawtooth signals inasmuch as the response of the device to negative-going signals may not be the same as with positive-going signals. To test with negative-going signals, the movable contact 70 in sawtooth unit 10 (Fig. 7) is thrown to close with fixed contact 67 to cause negative-going sawtooth signals to appear at the output of the unit. In these circumstances, the horizontal sweep of the trace of oscilloscope 27 is from right to left, and the test signals applied to device 12 are negative-going signals. If the device 12 is nonlinear, and if movable contact 92 (Fig. 8) is still maintained in the position used therefor when testing with positive-going signals, the trace will be displaced downwardly rather than upwardly of the base line 98. For better comparison, however, of tests made with positive-going signals and of tests made with negative-going signals, it is desirable that the trace be displaced upwardly of the base line in each instance. This upward displacement of the trace may be obtained in the case of testing with negative-going signals by throwing movable contact 92 (Fig. 8) in differentiator unit 21 to occupy the closed position which is opposite that occupied by the said movable contact when used during testing of device 12 by positive-going signals.

The results of the testing of a given device 12 with both positive-going sawtooth signals and negative-going sawtooth signals can be presented on the screen of the oscilloscope in a convenient manner by using the horizontal trace centering control of this instrument to bring the starting position of the trace to the horizontal cener of the screen, and by then testing the device first with positive-going signals and then with negative-going signals in the manner already described.

In some instances, it will be found that the vertical deviation 101 (Fig. 2) of the trace 100 may be so small as to not be readily observable. This difficulty may easily be remedied by increasing the vertical gain of the oscilloscope 27 by a known factor, and by then using the vertical centering control of the oscilloscope to bring the trace back to a vertical position which is observable on the screen.

The discussion thus far has been limited to a nonlinear device which exhibits no frequency distortion. In applications of the nonlinearity method it is desirable to use a repetitive waveform, and it is important to know the bandwidth requirements for the particular waveform selected. The necessary bandwidth will be a function of the degree of precision which is sought.

A simple Fourier analysis of the repetitive sawtooth is not applicable because much of the harmonic content is associated with the sharp trailing edge which is of no consequence for the purposes at hand. Therefore, the analysis will be made using a ramp function in conjunction with several elementary low and high pass filters. Considering first the low pass circuit of Fig. 3, the transfer function is $$\frac{1}{Ts+1}$$

where $T=RC$ and the transform of the ramp function is $$\frac{k}{s^2}$$

Thus the transform of the output is (1) $$\mathscr{L}e_{out} = \frac{k}{s^2(Ts+1)}$$

and (2) $$e_{out} = k(t - T(1 - e^{-t/T}))$$

Figure 4 is a plot of Equation 2 in which $t$ represents elapsed time since initiation of the sawtooth wave. When $t \cong 3.4\ T$, the departure from linearity of the sawtooth is less than 0.01. If the initial portion of the sweep is of interest, it is necessary to use a sweep of sufficient duration to permit the error to drop to the required limit during the early portion of the sweep. In most applications the nonlinearity occurs at the higher amplitudes and the high frequency attenuation is of lesser importance than the low frequency distortion.

For the high pass circuit of Fig. 5, the transfer function is given by $$\frac{Ts}{1+Ts}$$

and the transform of the output is (3) $$\mathscr{L}e_{\text{out}} = \frac{kTs}{s^2(1+Ts)}$$

and (4) $$e_{\text{out}} = KT(1-e^{-t/T})$$

Equation 4 is similar to the familiar expression for the current in an RL circuit with a step function input. If $t = 0.02\ T$ the departure from linearity is less than 0.01. The analysis of the Fig. 5 circuit also indicates, with with respect to the RC differentiator circuit in unit 10, that the time constant thereof must be short enough to permit the derivative of the waveform to rise to within a small percentage of the final value in a time short compared with the sweep time. As an example, if the derivative is to reach 98% of the final value in the first 5% of a 1 millisecond sweep, then there may be set up from these figures the simultaneous equations:

$$kT(1-e^{-t/T}) = 0.98\ kT$$

and $$e^{-t/T} = 0.92$$

having the solutions $$t/T = 3.9$$
$$T = 14.7\ \text{microseconds}$$

The analysis of the two elementary networks indicates the degree to which a poor low frequency response (Fig. 5 network) distorts the latter portions of the waveform and an inadequate high frequency response (Fig. 3 network) distorts the initial portion. Since such networks are illustrative of what may be expected in the way of frequency response in signal transfer devices of more complex circuitry, it is necessary to determine the distortion of the output waveform by the bandwidth limitations of the device under test.

Due to the number of conditions involved, a trial and error approach is convenient in determining if a given sweep duration for the sawtooth signal is appropriate for use with a particular device 12 to be tested. Thus a sweep duration is arbitrarily selected, and the bandwidth of the device to be tested computed for a given precision. If the bandwidth of the device is sufficient but not coincident with that of the waveform, the sweep duration can be altered. If the bandwidth of the device is not sufficient, the precision will suffer.

Several examples of presentations which may be expected are shown in Figs. 6A–6E wherein the line 102 is a vertical center line for the oscilloscope screen and wherein the trace 100 is a composite trace having right-hand and left-hand components which each start at line 102, and which respectively represent the results of testing with positive-going and negative-going signals in the manner already described. The first illustration (Fig. 6A) represents a device having a gain which varies linearly with signal. Fig. 6B is typical of an amplifier which is being overloaded symmetrically and Fig. 6C shows an asymmetry indicating that distortion is occurring more rapidly for the positive portion of the cycle. Figs. 6D and 6E indicate the results which would be obtained with devices having insufficient bandwidth. A rapid method for determining whether distortion is due to amplitude or frequency limitations is to drastically reduce the amplitude of the sawtooth. If this does not result in a change of shape the effect is naturally due to inadequate bandwidth.

While the foregoing description has dealt with testing for nonlinearity, the described testing system is useful also in the determination of the dynamic gain of an amplifier, transconductance of a vacuum tube, dynamic current gain of a transistor (alpha or beta), or any other characteristic which is determined by taking the partial derivative of one electrical quantity with respect to another electrical quantity.

For example, if a triode 12a is connected as shown in Fig. 9 so that a sawtooth voltage signal is applied to the grid of the triode, a substantially constant plate voltage is impressed on the tube from the battery 110, and a small value resistor 111 is interposed in the plate circuit of the tube to convert current therein into a voltage which is thereafter differentiated by unit 21, then the trace obtained on oscilloscope 27 can be considered a plot of $g_m$, the partial derivative of plate current with respect to grid voltage as the plate voltage stays constant. As another example, if a transistor 12b is connected as shown in Fig. 10 so that a sawtooth current signal is applied to the base electrode, and so that a low value resistor 112 is connected between the collector and a source 113 of voltage of constant value to convert the collector current into a voltage which is differentiated by unit 21, then the trace obtained on oscilloscope 27 can be considered a plot of $\beta$ (beta), the partial derivative of the collector current with respect to base current as the collector voltage stays constant.

Figure 11 shows a modification of the Fig. 1 apparatus in which the rise (or fall) characteristic of each waveform of the repetitive testing signal is given by the relation $e = at^2$ where $e$ is voltage and $t$ is time. The testing signal of the Fig. 11 apparatus thus consists of repetitive parabolic waveforms rather than of sawtooth waveforms. The parabolic waveform is, however, related to the sawtooth waveform in that, mathematically speaking, the former is the integral of the latter, and in that the parabolic waveform may be generated by electrically integrating an originally developed linear sawtooth waveform. As later described in further detail, in the Fig. 11 apparatus the electrical unit 10 is modified to so generate a testing signal of parabolic waveform from a signal of linear sawtooth waveform originally developed, as previously described, by the unit 10.

The parabolic signal from unit 10 is supplied via lead 11 to the device 12 under test to pass through this device, and to then be supplied via lead 15 to the fixed contact 16. Also, the parabolic signal may be supplied from unit 10 to the fixed contact 18 by way of a lead 17 which bypasses the device 12. The movable contact 19 may be thrown to close either with the fixed contact 16 or with the fixed contact 18. Ordinarily, the contact 19 is closed with contact 16 to receive the parabolic signal after it has been subjected to the distorting effect, if any, of the device 12. However, if it is desired to determine whether or not device 12 loads the unit 10 to an undue degree, the contact 19 is closed with contact 18 as part of the procedure in making such determination. This procedure has been fully described heretofore in connection with the sawtooth testing signal.

From the movable contact 19, the parabolic signal is supplied by lead 20 to the electrical unit 21 which, when employed in the Figure 11 apparatus, is modified to give a double differentiating action rather than the single differentiating action which is provided by this unit when used in the Fig. 1 apparatus. The manner in which unit 21 is so modified will be later described in further detail.

As has already been discussed, if a sawtooth waveform is differentiated once, and if this sawtooth waveform has a linear rise (or fall) characteristic, the result of the signal differentiation will be a square waveform which is of constant voltage value throughout its duration. Now, as previously stated, the parabolic signal of the Figure 11 apparatus has a waveform which represents the first integral of a linear sawtooth waveform. Therefore, if the parabolic signal is not distorted at all by the device 12, and if this parabolic signal is differentiated twice in the electrical unit 21, the output of unit 21 will again be a square waveform which, ideally, is of absolutely constant voltage value throughout its duration.

The square wave output of unit 21 is supplied by lead 25 to the vertical deflection or "Y" terminal 26 of the oscilloscope 27. Simultaneously, a synchronous signal for generating a time base is applied to the horizontal deflection or "X" terminal 28 of the oscilloscope. As shown in Fig. 11, this last-named signal may be a linear sawtooth signal which is developed by electrical unit 10 as a preliminary to the generation of the parabolic testing signal, and which is supplied as an output from unit 10 via lead 120 to terminal 28 of oscilloscope 27. Alternatively, the horizontal deflecting signal may be a sawtooth which is generated internally of oscilloscope 27 by a sweep circuit forming a component of the oscilloscope. The sweep circuit is connected in a conventional manner to synchronize the sawtooth waveform signal with the square waveform signal received on the vertical deflection terminal 26. Also, in some applications, it may be desirable to use as a horizontal deflection signal a parabolic waveform signal which is the same as the parabolic testing signal or which is synchronized therewith.

In any event, the horizontal deflecting signal, however generated and whatever its waveform, should be synchronized with the square wave vertical deflection signal in order to permit proper interpretation of the trace developed on the screen of the oscilloscope. Also, it is often advantageous that the horizontal deflection signal be functionally related in amplitude to the parabolic testing signal. Examples of where such functional relation in amplitude exists are where the horizontal deflecting signal is provided by the described sawtooth signal on lead 120, or by the parabolic testing signal itself. The advantage involved in the use of a horizontal deflecting signal which is functionally related in amplitude to the testing signal is that no adjustment need be made to the oscilloscope for parabolic testing signals of different durations, since the spatial interval occupied by the portion of interest of the trace on the oscilloscope will be the same spatial interval for different durations of the testing signal, and will thus be rendered independent of time.

The parabolic testing signal, when passed through a perfectly linear device 12, and when, thereafter, differentiated twice, will produce on the screen of the oscilloscope a trace which as the same as the previously described trace obtained when a linear sawtooth testing signal is passed through a linear device 12, and is then differentiated once. In both cases the trace will have the form of a straight horizontal line which is vertically displaced from the point on the screen representing zero voltage. If, on the other hand, the device 12 is non-linear to a significant degree, then the trace of the twice-differentiated parabolic testing signal will be characterized by a vertical deviation from its initial horizontal path. This vertical deviation may be either a droop or a rise dependent on whether the testing signal has a positive-going or a negative-going parabolic waveform. In the case of a positive-going parabolic waveform, any nonlinearity of the device 12 will be manifested as a droop in the trace, and the appearance of the trace will be similar to that shown in Fig. 2 for a positive-going sawtooth testing signal which is passed through a non-linear device 12.

In connection with Fig. 2, it will be recalled that, where a sawtooth testing signal is used, the ratio of the amount of vertical deviation 101 of the trace 100 at a given time "T" to the initial amount of displacement 99 of the trace 100 from the base line 98, is a ratio which is a measure of the degree of nonlinearity of the device 12. In like manner, when a parabolic testing signal is used, the ratio of the amount 101 to the amount 99 again provides a measure of the degree of nonlinearity of the device 12. However, the correlation between the quantitative value of the mentioned ratio and the quantitative value expressing the nonlinearity of the device 12 is somewhat more complex in the instance where a parabolic testing signal is used.

Figure 12 shows modification which may be made to the circuits shown in Fig. 7 in order to enable the electrical unit 10, when used in the Fig. 11 apparatus, to provide a parabolic testing signal. Comparing Figs. 7 and 12, it will be seen that the modification to the Fig. 7 circuits is made by inserting an inverting amplifier stage 125 and a subsequent "Miller feed-back integrator" stage 126 between the tubes 51 and 57 which, in the Fig. 7 circuits, act, respectively, as a cathode follower and as a phase splitter. The effect of the modification is as follows. The inverting amplifier 125 translates the positive-going sawtooth waves from tube 51 into negative-going sawtooth waves. These negative-going waves are then applied to the Miller feed-back integrator stage 126. The arrangement and connections of the named Miller circuit are fully disclosed on pages 310 and 311 of the text book "Waveforms" (published in 1949 by McGraw, Hill), and, hence, will not be here discussed. The Miller circuit serves, however, to electrically integrate the negative-going sawtooth waves received from amplifier 125, and, thereafter, to provide the integrated waves as an output in the form of positive-going waves which each have a parabolic rise characteristic. These parabolic waveform signals are supplied to the phase-splitter tube 57 which, as previously described, enables either positive-going or negative-going testing signals to be applied to the device 12 under test.

Fig. 13 shows the modification which is made to the circuits of Fig. 8 to enable the electrical unit 21, when used in the Fig. 11 apparatus, to provide a double differentiating action for a parabolic testing signal. Comparing Fig. 13 to Fig. 8, the modification which is made to the Fig. 8 circuits is to insert, between the RC differentiator circuit 83, 84 and the amplifying tube 85, a two-stage amplifier section 130 which is followed by another RC differentiator circuit comprised of the capacitor 131 and the resistor 132. The first differentiator circuit 83, 84 serves, by its differentiating action, to convert the received parabolic testing signals into sawtooth signals. These sawtooth signals are then amplified by the two-stage amplifier section 130 to be supplied without inversion to the second differentiator circuit 131, 132. This second differentiator circuit by its differentiating action converts the sawtooth signals received thereby into the square wave signals which have been previously described as being supplied (Fig. 11) to the vertical deflection terminal 26 of the oscilloscope 27.

The advantage in the use of a testing signal of parabolic waveform is as follows. As discussed in connection with a sawtooth testing signal, a device to be tested with the Fig. 1 apparatus requires, in addition to amplitude linearity, a certain frequency bandwidth in order to faithfully reproduce the waveform. The high frequency components associated with a sawtooth waveform are due to the initial portion of the waveform, which represents an abrupt change, whereas the low frequency requirements are due to duration of the waveform in the sense that, insofar as the low frequency requirements are concerned, the longer the duration of an individual sawtooth wave, the greater the low frequency requirements. Therefore, if the abruptness of the initial portion of the waveform can be rounded off, the high frequency components will be reduced. Also, if additional curvature can be introduced into the durations of the individual waveforms of the testing signal, the low frequency requirements can be lessened. A testing signal of parabolic waveform accomplishes both of these desirable changes in the testing signal. Thus, the use of a parabolic testing signal results in narrower bandwidth requirements than does the use of a sawtooth testing signal.

The above-described method and apparatus embodiments being exemplary only, it will be understood that the present invention comprehends embodiments differing in form or detail from the above-described embodiments. Accordingly, the invention is not to be considered as limited save as is consonant with the scope of the following claims.

I claim:

1. Apparatus for measuring an electrical characteristic of a device adapted to transfer a signal from an input thereof to an output thereof, said apparatus comprising, a source of signals of parabolic waveform, means to couple said signals to said input for transfer through said device to said output, double differentiator means adapted to be coupled to said output to twice differentiate the signal thereat, and means to register the time variations in amplitude of said twice differentiated signal.

2. Apparatus for measuring an electrical characteristic of a device adapted to transfer a signal from an input thereof to an output thereof, said apparatus comprising, a source of signals of parabolic waveform means to couple said signals to said input for transfer through said device to said output, a double differentiator circuit adapted to be coupled to said output to twice differentiate the signal thereat, a cathode ray oscilloscope respectively responsive to first and second input signals thereto to produce respective deflections of a trace in respective directions at right angles to each other, means to supply the doubly differentiated signals from said circuit as said first input signal to said oscilloscope, and means to supply a sawtooth signal which is functionally related in amplitude to said doubly differentiated signals as said second input signal to said oscilloscope.

3. Apparatus as in claim 2 wherein said double differentiator circuit is comprised of a first series circuit of resistance means and capacitance means, a second series circuit of resistance means and capacitance means, and amplifier means coupled between said first and second series circuits.

References Cited in the file of this patent

UNITED STATES PATENTS 2,618,686     De Lange     Nov. 18, 1952